J. E. CRAWFORD.
DIRIGIBLE HEADLIGHT.
APPLICATION FILED MAY 4, 1916.

1,235,444.

Patented July 31, 1917.
2 SHEETS—SHEET 1.

Inventor
J. E. Crawford.

Witnesses

By John Louis Waters & Co.
Attorney

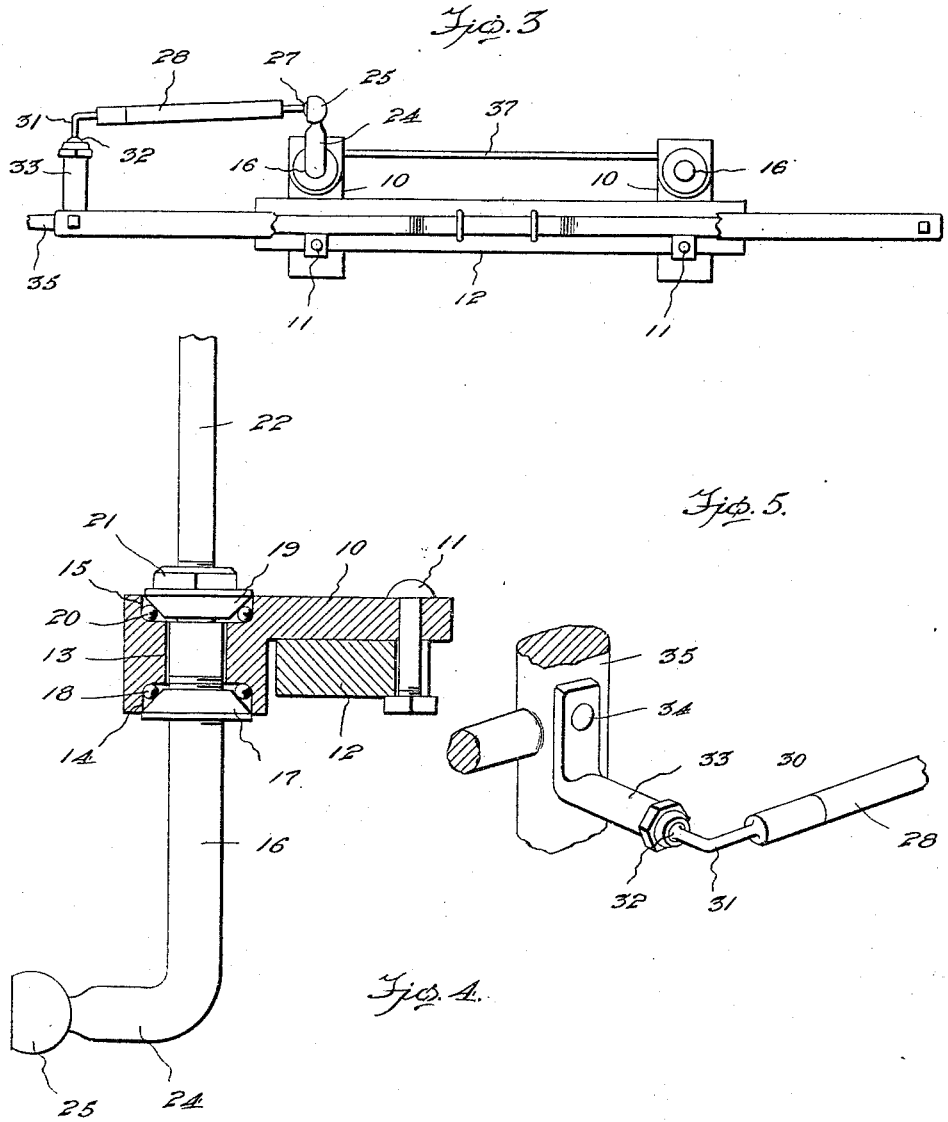

UNITED STATES PATENT OFFICE.

JAMES E. CRAWFORD, OF TULIA, TEXAS.

DIRIGIBLE HEADLIGHT.

1,235,444.　　　　　Specification of Letters Patent.　　Patented July 31, 1917.

Application filed May 4, 1916. Serial No. 95,375.

*To all whom it may concern:*

Be it known that I, JAMES E. CRAWFORD, a citizen of the United States, residing at Tulia, in the county of Swisher and State of Texas, have invented certain useful Improvements in Dirigible Headlights, of which the following is a specification, reference being had therein to the accompanying drawing.

This invention relates to improvements in dirigible head light supports for motor cars, one object of the invention being the provision of a device of this character which is readily applied to automobiles now in use and which is adapted to be operated from the steering knuckles of the steering wheels, so that the rays of light from the lamps will be projected in the direction of travel at all times.

A further object of this invention is the provision of a device of this character which is simple, durable and inexpensive in construction and thoroughly efficient and practical in use.

In the accompanying drawings:—

Fig. 3 is a bottom plan view thereof.

Figs. 4 and 5 are detail views.

Figure 1:
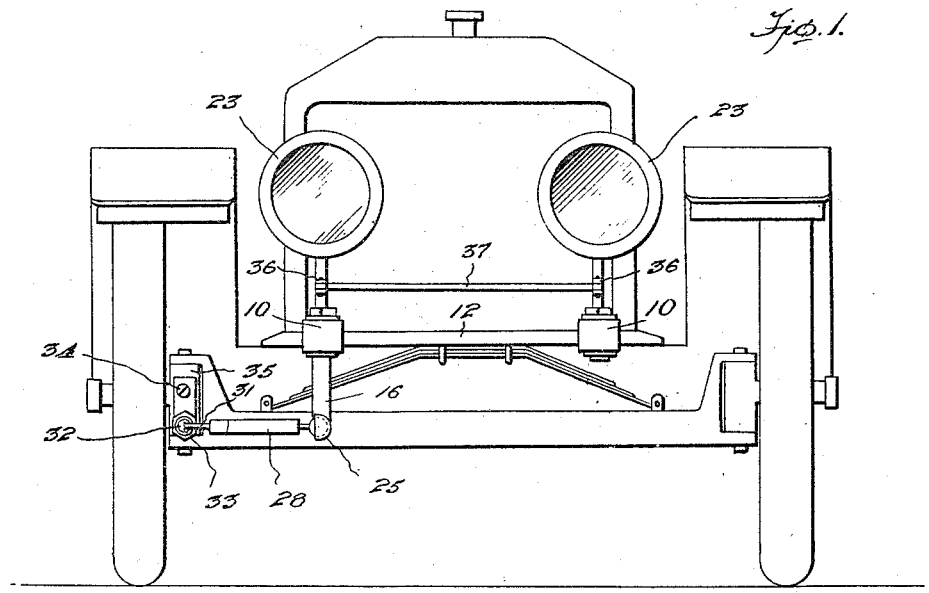
Figure 1 is a front elevation of the present device as applied to a motor car.
Figure 2:
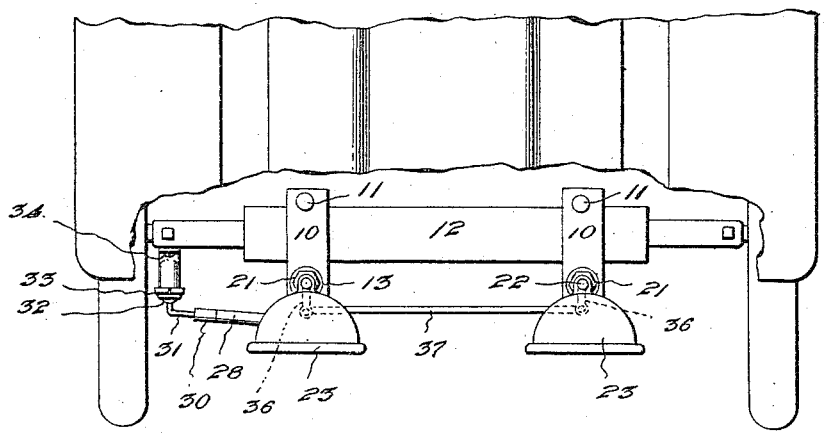
Fig. 2 is a top plan thereof.

Referring to the drawings, the numeral 10 designates the two supporting plates which are adapted to be secured by means of the bolts 11 to the spring supported bar 12 of the motor car.

Each one of these plates is provided with a vertical bore 13 therethrough and also with ball bearing receiving cups or races 14 and 15 formed, respectively, in the upper and lower surfaces about the bore.

Mounted for oscillation in said bore is a shaft 16 which carries thereon the lower permanent collar 17 for supporting the lower ball bearings 18 in the ball bearing cup 14, while adjustably carried by the shaft from the opposite side of each plate is the adjustable collar 19 for coöperation with the ball bearings 20 positioned in the ball bearing cup 15, the lock nut 21 being provided to hold the ball bearings in adjusted relation so that the shaft will be antifrictionally supported.

Upon the upper end of each of the shafts is mounted the lamp carrying yoke 22 for supporting the lamp 23.

The lower end of one of the shafts is extended downwardly and is provided with an outstanding arm or crank 24 formed with a ball socket 25 for the reception of the ball 27 which is carried by the adjusting sleeve 28. The opposite end of the adjusting sleeve is threaded to be connected to the shank 30. This shank 30 is formed with an integral angular hooked terminal 31 carrying the ball 32 which can swivel relatively to the opening 25′ formed in a ball confining socket member 26′ formed on a nut 27′ this nut being threadedly mounted upon the threaded end 28′ of an arm 33.

This arm 33 is formed upon the outer end of the supporting bracket 33′ which is attached by the bolt or other fastening means 34 to the steering knuckle 35 of one of the front wheels.

It will thus be seen that the present device will cause the respective lamps to be oscillated so that the rays of light therefrom will be projected in the direction of travel.

To insure movement in unison between the lamp carried shafts, each shaft may be provided with an arm 36 both of which are connected by a hinged joint to the radius rod 37.

By making a ball carrying member longitudinally adjustable, the present device is easily applied to motor cars now in use, and although the shaft carrying members are here shown as attached to the spring carrying bar, it is apparent that the same may be connected to the hood or chassis of the car.

By employing the ball and socket joints, the inequality or difference in movement between the chassis and the front axle will be taken care of without affecting the operation of the lamp carrying shafts.

What I claim as new is:—

In a device of the class described, in combination, a steering knuckle, a lamp shaft having a crank arm, a socket member fixed upon said crank arm with its opening at right angles to the length of said shaft, an adjustable sleeve having a ball at one end received universally in said socket member, a shank threaded upon said adjustable sleeve and having an angular hook-shaped portion formed upon its free end, a ball formed upon the outer end of said hook-shaped portion, an angular arm projecting at right angles and secured upon said steering knuckle, and a member secured to said angular arm and carrying an integral ball retaining socket portion receiving the last-named ball universally.

In testimony whereof I affix my signature.

JAMES E. CRAWFORD.